Dec. 15, 1964   L. V. BENT   3,161,268
LOUVER ASSEMBLY
Filed July 18, 1962   2 Sheets-Sheet 1
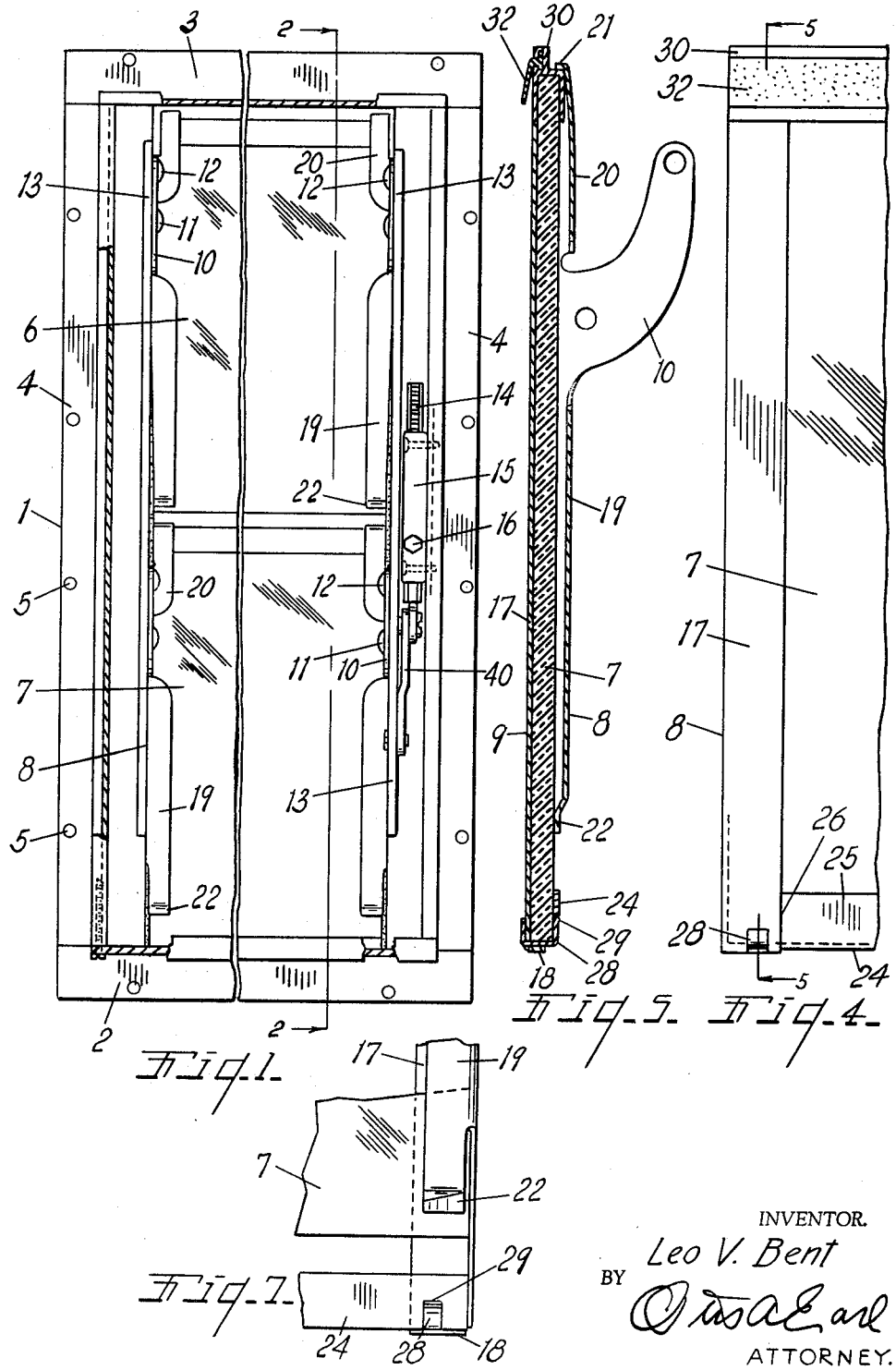
INVENTOR.
Leo V. Bent
BY
ATTORNEY.

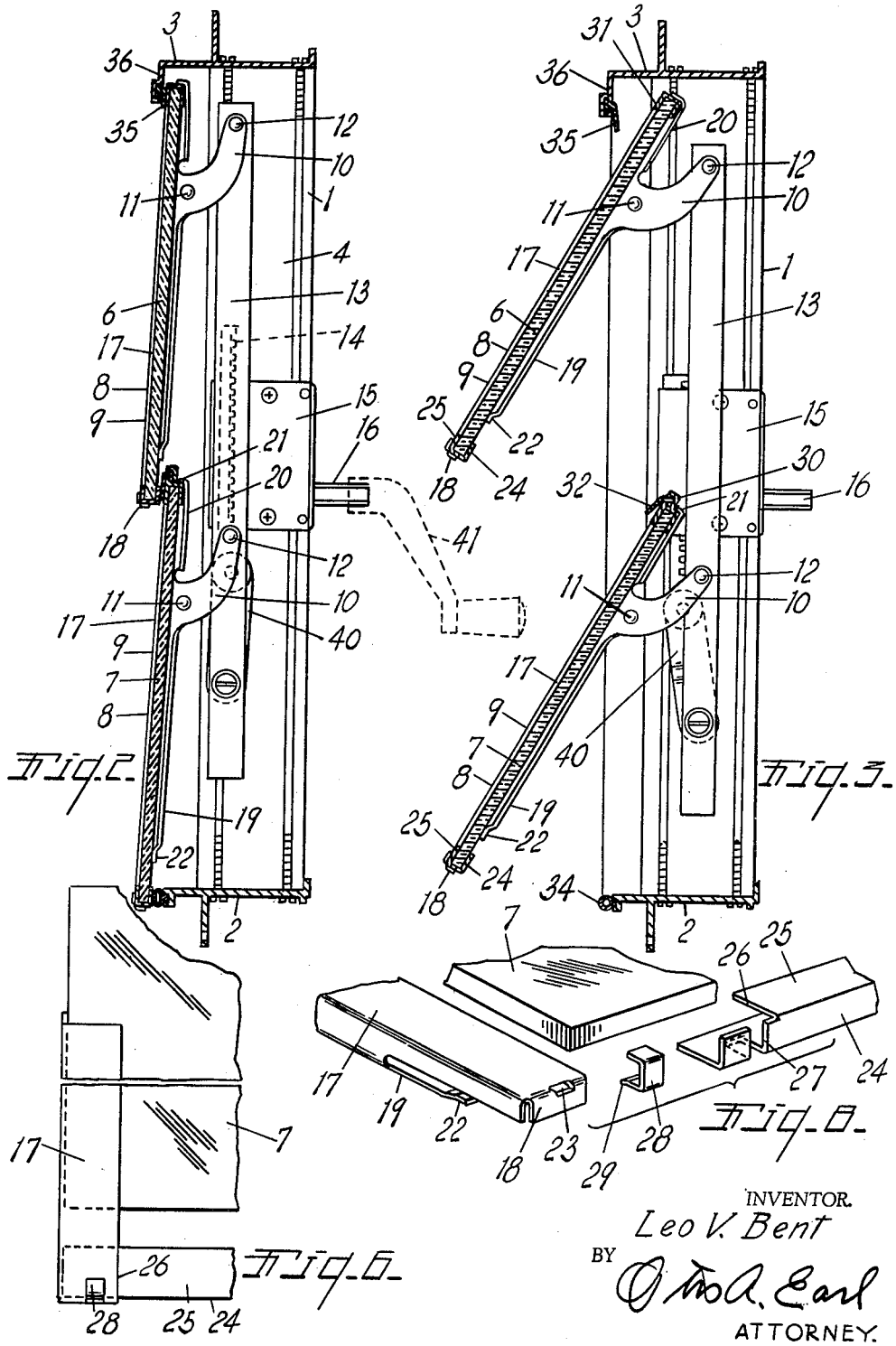

United States Patent Office 3,161,268
Patented Dec. 15, 1964

3,161,268
LOUVER ASSEMBLY
Leo V. Bent, Marcellus, Mich., assignor to Tailormade Industries, Inc., Marcellus, Mich
Filed July 18, 1962, Ser. No. 210,659
6 Claims. (Cl. 189—69)

This invention relates to louver type windows.

The main objects of this invention are:

First, to provide a panel support assembly in which the panel is effectively supported and all edges thereof concealed and protected without subjecting the panel to stress in assembling or in operation of the louver.

Second, to provide a louver having these advantages in which the parts may be quickly assembled and disassembled.

Third, to provide a louver assembly having these advantages in which no riveting or bolting of parts in assembly in a window frame is required other than the supporting pivots connecting the units to a frame and the operating connections.

Fourth, to provide a louver assembly having these several advantages in which the panel may be inserted and removed without disengaging or removing the assembly from a supported window casing.

Objects relating to details and economies of the invention will appear from the description to follow. The invention is defined and pointed out in the claims.

A preferred embodiment of the invention is illustrated in the accompanying drawing, in which:

FIG. 1 is a fragmentary inside or rear view of a window embodying my invention.

FIG. 2 is a vertical section on a line corresponding to line 2—2 of FIG. 1, certain adjusting parts being indicated by dotted lines, the louvers being shown in closed position.

FIG. 3 is a sectional view corresponding to FIG. 2 with the louvers in partially open position.

FIG. 4 is a fragmentary front elevational view of a louver unit embodying my invention.

FIG. 5 is a vertical section corresponding to line 5—5 of FIG. 4.

FIG. 6 is a fragmentary front or outer view illustrating the panel partially removed from its supporting frame.

FIG. 7 is a fragmentary or inner rear side view with the panel in position shown in FIG. 6.

FIG. 8 is a fragmentary perspective view of frame parts and panel in disassembled relation illustrating structural details of the panel supporting frame.

In the embodiment of my invention illustrated the window frame or casing, designated by the numeral 1, comprises a sill portion 2, top portion 3, and side portions 4. The sill, side and top portions have holes 5 therein adapted to receive attaching screws or rivets. It will be understood that the frame and other parts are greatly varied in the matter of dimensions.

The embodiment of my invention illustrated comprises the upper glass panel 6 and lower glass panel 7, these being desirably of the same dimensions. The assembled units are the same with the exception that the top crosspiece of the lower panel is adapted to support a weatherstrip functioning between the panels when they are in closed position, as will be hereinafter pointed out.

The panes of glass of these units 8 are the same or desirably duplicates and at least in dimensions. Sometimes it is desirable to use colored glass in one of the paneled units and each panel unit comprises a pair of oppositely facing panel support members 9 having rearwardly and upwardly projecting arms 10 pivoted at 11 on the frame side members. The inner ends of these arms are pivotally connected at 12 to the links 13 so that the panel units are simultaneously actuated. One of the links 13 is connected by a link 40 to the rack 14 which is actuated by gearing disposed in the housing 15 and provided with an operating spindle 16 adapted to receive the operating crank 41, as shown by dotted lines in FIG. 2. The details of this gearing or operating means are not illustrated as they form no part of the present invention except as operating means connecting to the arms 10.

The panel support members 9 are duplicated except that they face each other to receive the ends of the panels, therefore the following description of the panel support member is directed to a single unit. The support member 9 has a front supporting flange 17 terminating at its upper end in downwardly spaced relation to the upper end of the support member and it has a rearwardly projecting lug 18 on its lower end. The support member has a lower rear flange member 19 below the arm 10 which terminates at its lower end in vertically spaced relation to the rearwardly projecting lug 18 on the lower end of the front flange. The upper rear flange 20 terminates at its upper end in a forwardly projecting lug 21. The lower flange 19 terminates with its lower end in an offset portion 22 which springably engages the rear side of the panel, as is illustrated in FIG. 5.

The front flange has a slot-like hole 23 therethrough above the bottom lug 18. The bottom crosspiece 24 is of upwardly facing channel cross section and its outer flange 25 terminates in spaced relation to its end to provide a shoulder 26 which is in supported engagement with the outer flange of the end member, see FIG. 4.

A slot 27 is formed in the bight portion and inner flange of this bottom crosspiece dimensioned to receive the U-shaped clip 28 which is disposed through the slot 23. The inner end of this clip 28 is desirably deflected at 29 so that the panel readily slides into the clip as the panel is thrust downwardly from a retracted position as is indicated in FIGS. 6 and 7. When the panel is thrust downwardly to its seated position, as indicated in FIGS. 4 and 5, the bottom crosspiece is effectively locked to the end member.

The top crosspieces 30 and 31 for the panel unit 8 are duplicates except that the bottom unit is provided with a seal 32 with which the upper unit engages when the panels are in closed position, as indicated in FIG. 2. However, that seal forms no part and has no direct functioning relation to the present parts as directed, but the top crosspiece is an important part and it is of downwardly facing channel section embracing the upper edge of the panel with its ends retainingly engaged below the forwardly projecting lugs 21 on the end members. It will be noted that this top crosspiece is disposed on the front side of the upper portions 20 of the rear flanges and retainingly engaged by the lugs 21. With this arrangement of parts the panels are effectively supported with their edges protected or completely guarded.

The bottom crosspiece of the lower panel when in closed position engages the resilient seal member 34 on the outer edge of the sill of the frame and the upper edge of the upper panel unit engages the seal member 35 on the inner side of the downwardly projecting flange 36 on the top 3 of the frame. With parts thus arranged when the panels are closed a very effective seal results.

With this arrangement of parts the panels can be assembled with the support members after they have been assembled in the frame which facilitates not only the original assembly of the parts but is sometimes advantageous to meet particular requirements as to color of panels or the like.

I have illustrated and described my invention in a highly practical embodiment thereof. I have not attempted to illustrate or describe other adaptations or embodiments which I contemplate as it is believed this disclosure will enable those skilled in the art to embody or adapt my invention as may be desired.

Having thus described the invention what is claimed as new and desired to secure by Letters Patent is:

1. A louver assembly comprising a panel, oppositely facing panel support members having rearwardly projecting pivot arms spaced downwardly from their upper ends, and having front panel supporting flanges terminating at their lower ends in rearwardly projecting panel supporting lugs and having slots therein above said lugs, said panel support members having upper and lower rear flanges disposed above and below their said arms, the lower rear flanges terminating in spaced relation to said lugs on the lower ends of said front flanges, the upper rear flanges terminating at their upper ends in forwardly projecting lugs which are spaced upwardly relative to the upper ends of said front flanges, a bottom crosspiece of upwardly facing channel section embracing the lower edge of said panel, the end edges of the outer flange of said bottom crosspiece being in abutting engagement with the edges of the front flanges of said panel support members, said bottom crosspiece having slots in the bight and inner flange thereof aligned with said slots in said panel support member front flanges, U-shaped clips disposed through said slots in said front flanges of said panel support members in interlocking engagement with said slots in said panel support members and said bottom crosspiece, and a top crosspiece of downwardly facing channel section disposed on the upper edge of said panel and in supported engagement with said forwardly projecting lugs on said upper rear flanges of said panel support members.

2. A louver assembly comprising a panel, oppositely facing panel support members having rearwardly projecting pivot arms spaced downwardly from their upper ends, and having front panel supporting flanges terminating at their lower ends in rearwardly projecting panel supporting lugs and having slots therein above said lugs, said support members having upper and lower rear flanges disposed above and below their said arms, the lower rear flanges terminating in spaced relation to said lugs on the lower ends of said front flanges, the upper rear flanges terminating at their upper ends in forwardly projecting lugs which are spaced upwardly relative to the upper ends of said front flanges, a bottom crosspiece of upwardly facing channel section embracing the lower edge of said panel, said bottom crosspiece having slots in the bight and inner flange thereof aligned with said slots in said support member front flanges, U-shaped clips disposed through said slots in said front flanges of said support members in interlocking engagement with said slots in said support members and said bottom crosspiece, and a top crosspiece supportedly engaging the upper edge of said panel and said lugs on said upper rear flanges of said support members.

3. A louver assembly comprising a panel, oppositely facing panel support members having rearwardly projecting pivot arms spaced downwardly from their upper ends, and having front panel supporting flanges terminating at their lower ends in rearwardly projecting panel supporting lugs and having slots therein above said lugs, said panel support members also having rear panel supporting flanges, a bottom crosspiece of upwardly facing channel section embracing the lower edge of said panel, the end edges of the outer flange of said bottom crosspiece being in thrust engagement with the inner edges of said front flanges of said panel support members, said bottom crosspiece having slots in the bight and inner flange thereof aligned with said slots in said support member front flanges, clips disposed through said slots in said front flanges of said panel support members in interlocking engagement with said slots in said bottom crosspiece, and a top crosspiece of downwardly facing channel section disposed on the upper edge of said panel and detachably engaged with said panel support members and acting when engaged therewith to prevent upward movement of said panel relative to said panel support members.

4. A louver assembly comprising a panel, oppositely facing panel support members having rearwardly projecting pivot arms spaced downwardly from their upper ends and having front panel supporting flanges terminating at their lower ends in rearwardly projecting panel supporting lugs and having slots therein above said lugs, said panel support members also having rear panel support members, a bottom crosspiece of upwardly facing channel section embracing the lower edge of said panel, said bottom crosspiece having slots in the bight and inner flange thereof aligned with said slots in said panel support member front flanges, clips disposed through said slots in said front flanges of said panel support members in interlocking engagement with said slots in said panel support members and said bottom crosspiece, and a top crosspiece disposed on the upper edge of said panel and detachably engaged with said panel support members and acting when engaged therewith to prevent upward movement of said panel relative to said panel support members.

5. A louver assembly comprising a panel, panel support members having rearwardly projecting pivot arms spaced from their upper and lower ends and having portions of inwardly facing channel section in which the ends of said panel are supportedly disposed, said support members having panel supporting elements at their lower ends and slots therein above said panel supporting elements, the rear flanges of said panel support members terminating at their lower ends in upwardly spaced relation to the lower ends of said panel support members, the front flanges terminating at their upper ends in downwardly spaced relation to the upper ends of said panel support members, a bottom crosspiece of upwardly facing channel section embracing the lower edge of said panel, said bottom crosspiece having slots therein aligned with said slots in said panel support members, clips disposed through said aligned slots in said panel support members and said bottom crosspiece and constituting interlocking means therefor, and a top crosspiece disposed on the upper edge of said panel and in supported engagement with the upper ends of said panel support members.

6. A louver assembly comprising a panel, oppositely facing panel support members having rearwardly projecting pivot arms spaced from their upper and lower ends and having inwardly projecting outer and inner panel supporting flanges and having panel supports at their lower ends, corresponding flanges having slots therein above said panel supports, a bottom crosspiece of upwardly facing channel section embracing the lower edge of said panel, the end edges of the outer flange of said bottom crosspiece being in thrust engagement with the inner edges of the outer flanges of said panel support members, said bottom crosspiece having openings therein aligned with said slots in said panel support member flanges, clips disposed through said slots in said panel support member flanges and said openings in said bottom crosspiece and constituting interlocking means therefor, and a top crosspiece engaging the upper edge of said panel and detachably engaged with the upper ends of said panel support members and acting when engaged therewith to prevent upward movement of said panel relative to said support members.

References Cited by the Examiner

UNITED STATES PATENTS

| | | | |
|---|---|---|---|
| 2,327,246 | 8/43 | Bunjes | 268—96 X |
| 2,640,233 | 6/53 | Silvers | 20—62 |
| 2,778,070 | 1/57 | Royer | 20—56.5 |
| 2,845,153 | 7/58 | West | 189—62 |
| 2,923,351 | 2/60 | Zitomer | 160—381 |
| 2,925,633 | 2/60 | Morgan et al. | 20—56.5 |

FOREIGN PATENTS 273,100  6/27  Great Britain.

HARRISON R. MOSELEY, *Primary Examiner.*

J. SCHNALL, *Examiner.*